US011993213B2

(12) United States Patent
Nishimura et al.

(10) Patent No.: US 11,993,213 B2
(45) Date of Patent: May 28, 2024

(54) FIXING STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Ryuta Takakura, Mie (JP); Syo Shiratori, Mie (JP); Satoshi Ujita, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 659 days.

(21) Appl. No.: 17/254,536

(22) PCT Filed: Nov. 1, 2018

(86) PCT No.: PCT/JP2018/040659
§ 371 (c)(1),
(2) Date: Dec. 21, 2020

(87) PCT Pub. No.: WO2020/003553
PCT Pub. Date: Jan. 2, 2020

(65) Prior Publication Data
US 2021/0276500 A1    Sep. 9, 2021

(30) Foreign Application Priority Data

Jun. 27, 2018 (JP) .................................. 2018-121917

(51) Int. Cl.
*B60R 16/02* (2006.01)
*F16B 5/12* (2006.01)
*F16B 19/10* (2006.01)

(52) U.S. Cl.
CPC ............ *B60R 16/0215* (2013.01); *F16B 5/12* (2013.01); *F16B 19/10* (2013.01)

(58) Field of Classification Search
CPC ........ B60R 16/0215; F16B 5/12; F16B 19/10; F16B 19/1081; H02G 3/30
(Continued)

(56) References Cited

U.S. PATENT DOCUMENTS 4,811,922 A * 3/1989 Yoneyama ............... H02G 3/26
                                                                248/548
4,918,261 A * 4/1990 Takahashi ................. F16L 3/23
                                                                174/72 A
(Continued)

FOREIGN PATENT DOCUMENTS

CN      1343849      4/2002
CN      1628218      6/2005
(Continued)

OTHER PUBLICATIONS

International Search Report (ISR) issued in International Patent Application No. PCT/JP2018/040659, dated Dec. 25, 2018, together with English translation thereof.
(Continued)

*Primary Examiner* — Muhammad Ijaz
(74) *Attorney, Agent, or Firm* — GREENBLUM & BERNSTEIN, P.L.C.

(57) ABSTRACT

A fixing structure of a wiring member includes a plate-like member provided in a vehicle, a wiring member disposed on a main surface of the plate-like member, and a fixing member fixing the wiring member to the plate-like member.
(Continued)

The fixing member includes a housing part inserted into the plate-like member, a locking protrusion provided to extend outward from the housing part, and a protrusion extension part housed in the housing part and spreading the locking protrusion outside to lock the locking protrusion inside the plate-like member.

14 Claims, 5 Drawing Sheets

(58) Field of Classification Search
USPC .......................................................... 248/68.1
See application file for complete search history.

(56) References Cited

U.S. PATENT DOCUMENTS

| | | | |
|---|---|---|---|
| 5,339,491 A * | 8/1994 | Sims | B60R 16/0215 16/2.2 |
| 6,443,403 B1 | 9/2002 | Page et al. | |
| 11,728,636 B2 * | 8/2023 | Ruayana | H02G 3/24 248/65 |
| 2005/0123372 A1 * | 6/2005 | Sato | F16B 5/0258 411/32 |
| 2014/0151116 A1 | 6/2014 | Doshita | |
| 2015/0047895 A1 * | 2/2015 | Doushita | H02G 3/24 174/480 |
| 2017/0335994 A1 | 11/2017 | Otterstrom | |
| 2020/0373702 A1 * | 11/2020 | Ebata | H01R 13/582 |
| 2022/0009426 A1 * | 1/2022 | Yamaguchi | H01B 7/285 |
| 2022/0059253 A1 * | 2/2022 | Ebata | H01B 7/08 |

FOREIGN PATENT DOCUMENTS

| | | |
|---|---|---|
| CN | 103733456 | 4/2014 |
| CN | 107110404 | 8/2017 |
| CN | 107112095 | 8/2017 |
| JP | 63-166635 | 7/1988 |
| JP | 11-247811 | 9/1999 |
| JP | 2000-67659 | 3/2000 |
| JP | 2000-192924 | 7/2000 |
| JP | 2008-88998 | 4/2008 |
| JP | 2012-193830 | 10/2012 |
| JP | 2015-102166 | 6/2015 |
| KR | 10-1242723 | 3/2013 |
| WO | 2014/175048 | 10/2014 |
| WO | 2016/069293 | 5/2016 |

OTHER PUBLICATIONS

International Preliminary Report on Patentability (IPRP) issued in International Patent Application No. PCT/JP2018/040659, dated Dec. 30, 2020, together with English translation thereof.
China Office Action issued in China Patent Application No. 201880094969.6, dated Oct. 11, 2021, together with English translation thereof.
Japan Office Action issued in Japan Patent Application No. 2019-186573, dated Apr. 26, 2022, together with English translation thereof.

* cited by examiner

FIXING STRUCTURE OF WIRING MEMBER

TECHNICAL FIELD

The present invention relates to a technique of fixing a wire member to a plate-like member.

BACKGROUND ART

Patent Document 1 discloses a technique of embedding and fixing a wire harness as a wiring member to a urethane member (also referred to as a silencer, for example) as a plate-like member disposed between a body and a floor mat in a bottom part of an automobile for purpose of acoustic insulation and flattening a concavo-convex shape, for example.

PRIOR ART DOCUMENTS

Patent Documents

Patent Document 1: Japanese Patent Application Laid-Open No. 63-166635

SUMMARY

Problem to be Solved by the Invention

However, in the technique described in Patent Document 1, the wire harness needs to be insert-molded as an insert component.

Accordingly, an object of the present invention is to provide a technique capable of easily fixing a wiring member to a plate-like member formed separately from the wiring member.

Means to Solve the Problem

In order to solve the above problems, a fixing structure of a wiring member according to a first aspect includes: a plate-like member provided in a vehicle; a wiring member disposed on a main surface of the plate-like member; and a fixing member including a housing part inserted into the plate-like member, a locking protrusion provided to extend outward from the housing part, and a protrusion extension part housed in the housing part, spreading the locking protrusion outside and locking the locking protrusion inside the plate-like member to fix the wiring member to the plate-like member, wherein the wiring member includes a sheet material in which a through hole is formed, and the housing part is inserted into the through hole.

A fixing structure of a wiring member according to a second aspect is the fixing structure of the wiring member according to the first aspect, wherein the fixing member includes: a first member including the housing part, the locking protrusion, and a locked part; and a second member including the protrusion extension part and a locking part locked to the locked part.

A fixing structure of a wiring member according to a third aspect is the fixing structure of the wiring member according to the second aspect, wherein the locked part is provided on an inner peripheral surface of the housing part, and the locking part is provided on an outer peripheral surface of the protrusion extension part.

A fixing structure of a wiring member according to a fourth aspect is the fixing structure of the wiring member according to any one of the first to third aspects, wherein the housing part is housed in a concave part formed in a main surface of the plate-like member in advance, and the locking protrusion is formed to be housed in the concave part in a state before the locking protrusion is spread by the protrusion extension part.

A fixing structure of a wiring member according to a fifth aspect is the fixing structure of the wiring member according to any one of the first to fourth aspects, wherein the plate-like member is formed softer than the locking protrusion, and the locking protrusion is formed into a tapered shape so as to be able to stick in the plate-like member.

A fixing structure of a wiring member according to a sixth aspect is the fixing structure of the wiring member according to any one of the first to fifth aspects, wherein the housing part includes a plurality of division pieces arranged in a circumferential direction to have a cylindrical shape in whole and a connection cylindrical part connecting the plurality of division pieces in a circumferential direction on a side opposite to the locking protrusion, and the locking protrusion includes a division locking protrusion provided on a tip end of each of the plurality of division pieces.

A fixing structure of a wiring member according to a seventh aspect is the fixing structure of the wiring member according to any one of the first to sixth aspects, wherein the fixing member further includes a housing part retaining piece formed to extend outward from the housing part and caught on the main surface of the plate-like member.

A fixing structure of a wiring member according to an eighth aspect is the fixing structure of the wiring member according to any one of the first to seventh aspects, wherein the fixing member further includes a protrusion extension part retaining piece formed to extend outward from the protrusion extension part and caught on an edge portion of the housing part.

A fixing structure of a wiring member according to a ninth aspect is the fixing structure of the wiring member according to any one of the first to eighth aspects, wherein a tip end portion of the fixing member is housed inside the plate-like member.

A fixing structure of a wiring member according to a tenth aspect is the fixing structure of the wiring member according to any one of the first to ninth aspects, wherein the wiring member includes a plurality of wire-like transmission members flattened by the sheet material, and the through hole is formed in a part of the sheet material different from a part where the plurality of wire-like transmission members are disposed.

A fixing structure of a wiring member according to a eleventh aspect includes: a plate-like member provided in a vehicle; a wiring member disposed on a main surface of the plate-like member; and a fixing member including a housing part inserted into the plate-like member, a locking protrusion provided to extend outward from the housing part, and a protrusion extension part housed in the housing part, and spreading the locking protrusion outside and locking the locking protrusion inside the plate-like member to fix the wiring member to the plate-like member, wherein the fixing member includes a fixing part fixed to the wiring member in a state before the protrusion extension part is housed in the housing part.

A fixing structure of a wiring member according to a twelfth aspect is the fixing structure of the wiring member according to eleventh aspect, wherein the wiring member includes a sheet material, and the fixing part is attached to a main surface of the sheet material.

A fixing structure of a wiring member according to a thirteenth aspect is the fixing structure of the wiring member according to eleventh aspect, wherein the wiring member includes a sheet material, and the fixing part sandwiches the sheet material.

EFFECTS OF THE INVENTION

According to each aspect, the locking protrusion of the fixing member is locked inside the plate-like member, thus the fixing member is fixed to the plate-like member. When this fixing member is used, the wiring member can be easily fixed to the plate-like member formed separately from the wiring member.

According to the second aspect, the locking protrusion can be extended and locked to the plate-like member by inserting the second member into the first member.

According to the third aspect, the extension of the locking protrusion and locking of the first member and the second member can be performed at the same time by inserting the second member into the first member.

According to the fourth aspect, the housing part can be inserted into the concave part from the side of the locking protrusion.

According to the fifth aspect, the fixing member can be easily locked to a soft plate-like member.

According to the sixth aspect, the locking protrusion can be easily extended when the protrusion extension part is housed in the housing part.

According to the seventh aspect, it is possible to prevent the housing part from coming out of the plate-like member toward the side of the other main surface.

According to the eighth aspect, it is possible to prevent the protrusion extension part from coming out of the housing part toward a front side.

According to the ninth aspect, it is possible to prevent the fixing member from having contact with a member such as a vehicle body panel located outside the other main surface of the plate-like member, for example.

DESCRIPTION OF EMBODIMENT(s)

Embodiment

Figure 1:
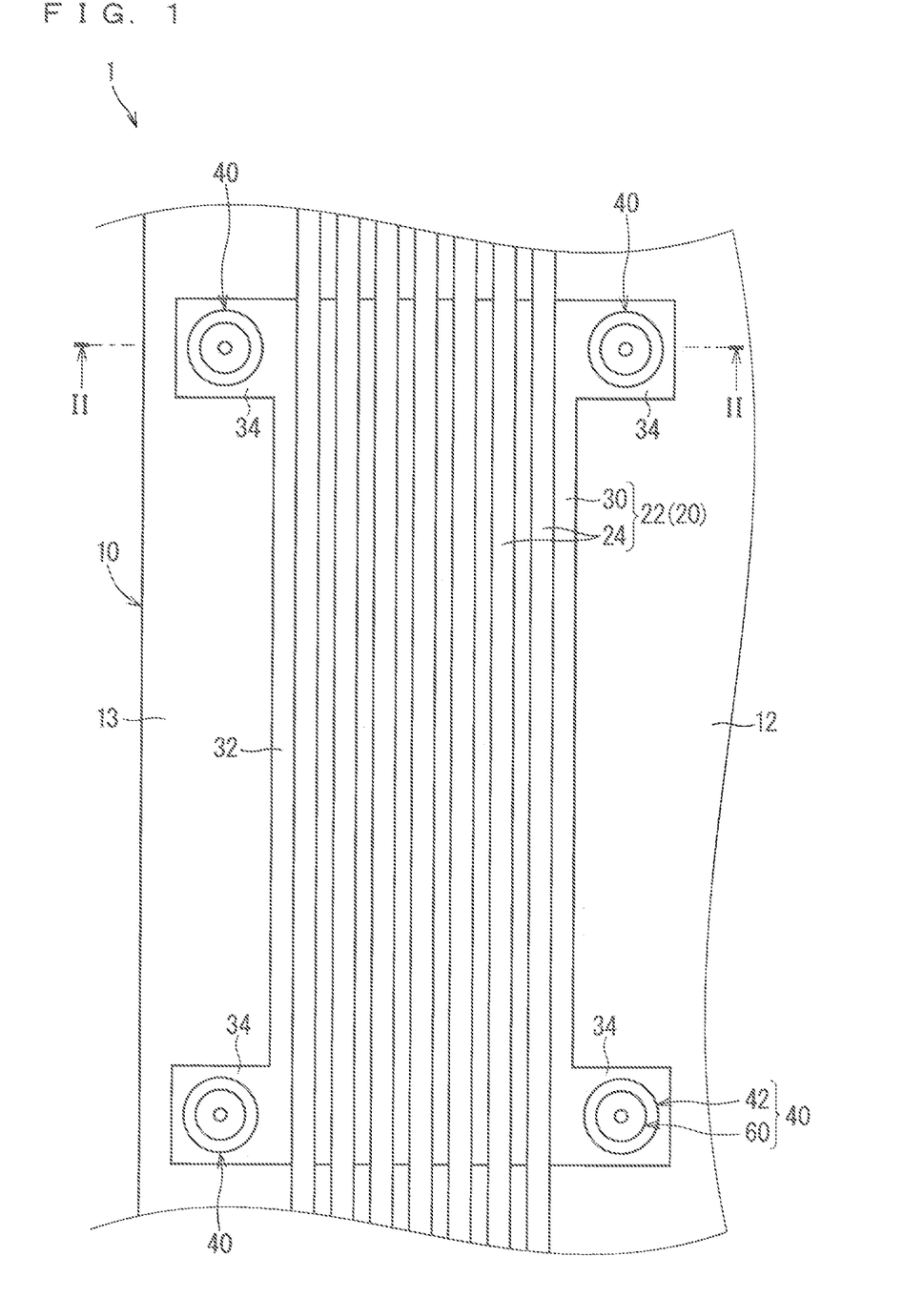
FIG. 1 is a plan view illustrating a fixing structure of a wiring member according to an embodiment.
Figure 2:
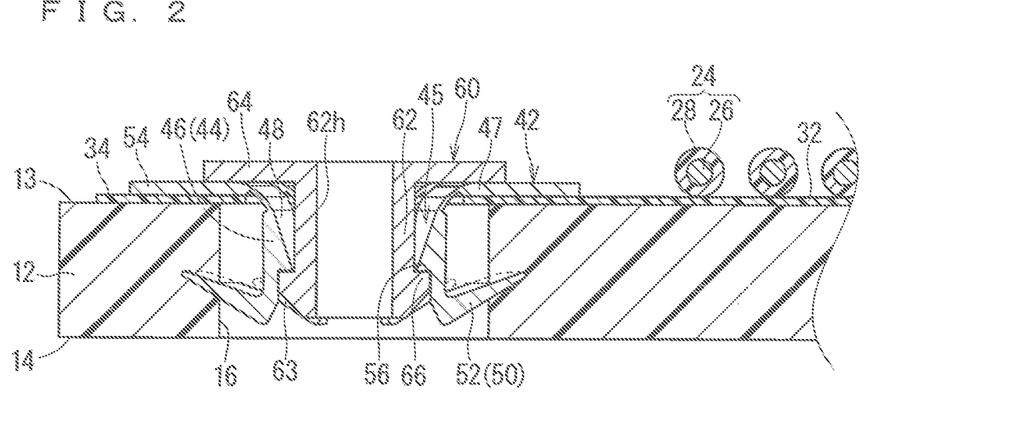
FIG. 2 is a schematic cross-sectional view of the fixing structure along a II-II line in FIG. 1.
Figure 3:
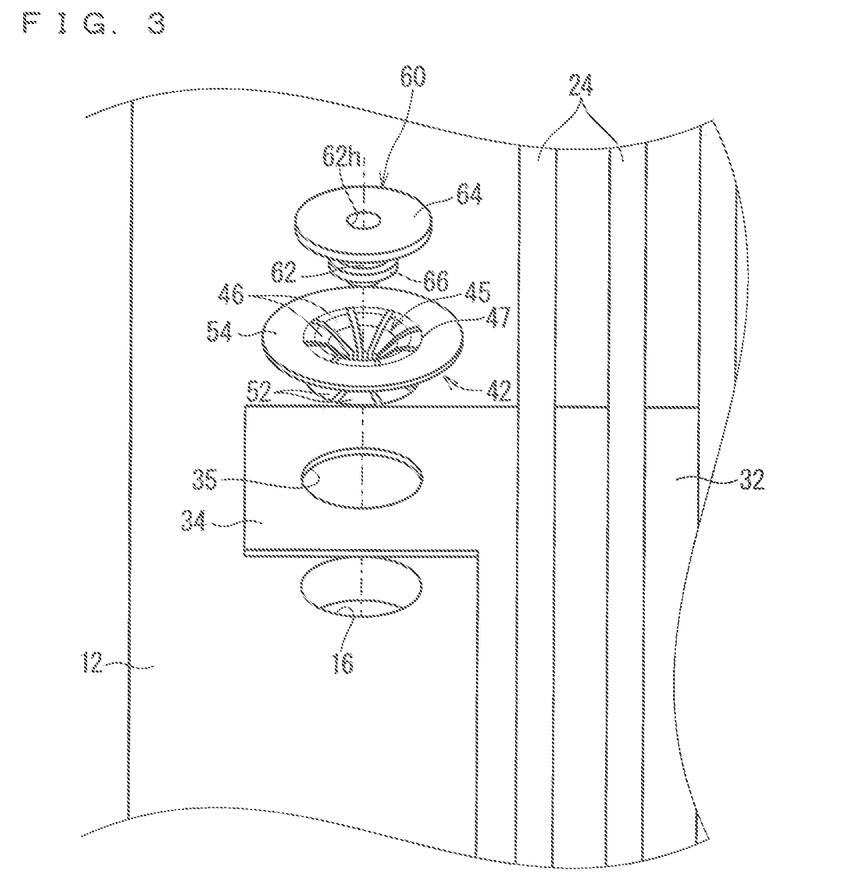
FIG. 3 is an exploded perspective view illustrating the fixing structure of the wiring member according to the embodiment.
Figure 4:
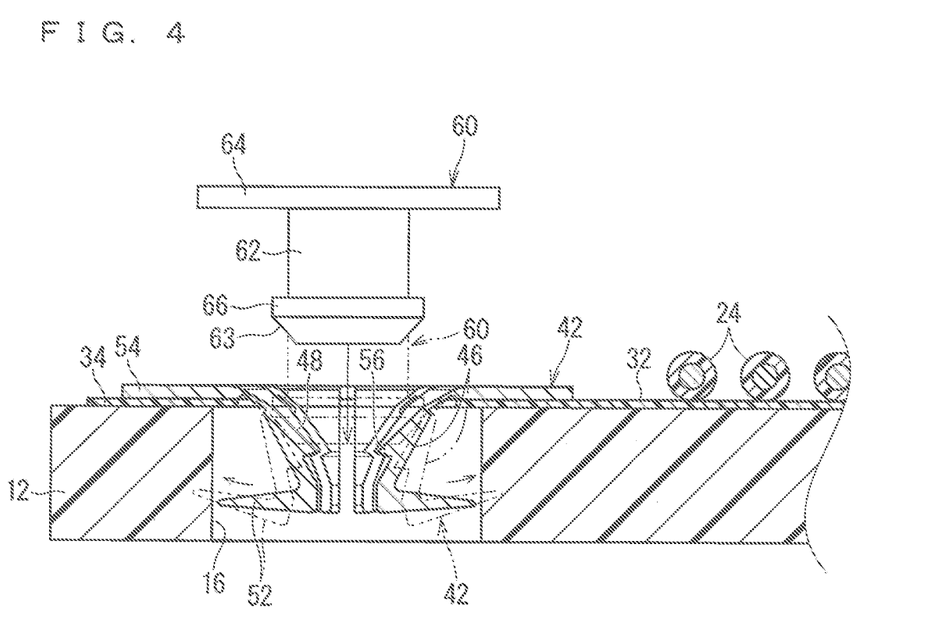
FIG. 4 is an exploded cross-sectional view illustrating the fixing structure of the wiring member according to the embodiment.

A fixing structure 1 of a wiring member according to an embodiment is described hereinafter. FIG. 1 is a plan view illustrating a fixing structure of the wiring member according to the embodiment. FIG. 2 is a schematic cross-sectional view of the fixing structure 1 cut along a II-II line in FIG. 1. FIG. 3 is an exploded perspective view illustrating the fixing structure 1 of the wiring member according to the embodiment. FIG. 4 is an exploded cross-sectional view illustrating the fixing structure 1 of the wiring member according to the embodiment. A virtual line in FIG. 4 illustrates a state of deformation of a fixing member 40.

A fixing structure 1 of the wiring member fixes a wiring member 20 in a vehicle. The fixing structure 1 of the wiring member includes a plate-like member 10, a wiring member 20, and a fixing member 40.

<Plate-like Member>

The plate-like member 10 is a member provided in a vehicle. The plate-like member 10 is a member provided in a floor, a ceiling, a side surface (door) of a vehicle. The plate-like member 10 is a member provided for purpose of acoustic insulation and shock absorption, for example. The plate-like member 10 is a member formed soft, for example. In the description hereinafter, the plate-like member 10 is a silencer, particularly a floor silencer disposed between a floor mat and a body in a vehicle. Specifically, the plate-like member 10 includes a body part 12.

The body part 12 includes one main surface 14 and the other main surface 14. The wiring member 20 is disposed on one main surface 13. A concave part 16 in which a housing part 44 is housed is formed in advance in one main surface 13.

The concave part 16 is formed in part of the body part 12. The concave part 16 is formed so that the part of one main surface 13 is concaved. In the example illustrated in FIG. 2, a through hole is formed as the concave part 16. That is to say, the concave part 16 is formed so that the other main surface 14 is also concaved in a side opposite to one main surface 13. However, a bottomed hole in which only one main surface 13 is concaved may be formed as the concave part 16. When the concave part 16 is the through hole, the concave part 16 can be easily formed. When the concave part 16 is the bottomed hole, reduction in acoustic insulation properties can be suppressed.

The body part 12 of the plate-like member 10 is formed into a plate-like shape by a material having acoustic insulation properties. In the description herein, the body part 12 of the plate-like member 10 is formed by mixing a chip of a resin foam such as foamed polyurethane with an adhesive agent (binder) applied to the chip and then compressing and integrally fixing them under vapor atmosphere. A known adhesive agent, such as a urethane chip adhesive agent, according to a material of the chip can be applied as the adhesive agent. The concave part 16 is formed by a pressing machine, for example, at a time of or after molding the body part 12.

However, a method of manufacturing the body part 12 of the plate-like member 10 is not limited thereto described above. For example, the body part 12 of the plate-like member 10 may be formed by foaming a resin material such as polyurethane and performing mold forming, or also may be formed of a material of a non-woven cloth. For example, the body part 12 of the plate-like member 10 is formed of numberless compressed fibrous members. In this case, the numberless fibrous members may be entangled with and bonded to each other, or may also be fixed by an adhesive agent, for example. The fibrous members may be made up of natural fiber or chemical fiber.

In the example illustrated in FIG. 2, a part of the body part 12 of the plate-like member 10 in which the concave part 16 is not formed is flatly formed, but may have a portion with concave and convex in a thickness direction for purpose of following a shape of the body or partially adding a volume of the plate-like member 10.

<Wiring Member>

The wiring member 20 is a member joined to a component mounted to the vehicle to transmit electrical power or light to and/or from the component. The wiring member 20 is disposed on one main surface 13 of the plate-like member 10. The wiring member 20 includes a wire body which is flatly formed. In the description hereinafter, the flat wire body is a sheet material-attached wire body 22. The sheet material-attached wire body 22 includes a plurality of wire-like transmission members 24 and a sheet material 30.

It is sufficient that the wire-like transmission member 24 is a wire-like member transmitting electrical power or light. For example, the wire-like transmission member 24 may be a general wire having a core wire and a covering around the core wire, or may also be a bare conductive wire, a shielded wire, an enamel wire, a nichrome wire, or an optical fiber. The wire-like transmission member 24 transmitting the electrical power may be various kinds of signal lines or various kinds of power lines.

Herein, the wire-like transmission member 24 includes a transmission wire body transmitting electrical power or light and an outer coat covering the transmission wire body. In the description hereinafter, the wire-like transmission member 24 is a general wire 24 (simply referred to as the electrical wire 24 hereinafter). That is to say, the electrical wire 24 includes a core wire 26 as the transmission wire body and an insulating covering 28 as the outer coat covering the transmission wire body.

The core wire 26 is made up of one or a plurality of strands. The strand is formed of a conductor made of copper, copper alloy, aluminum, or aluminum alloy, for example. When the core wire 26 is made up of the plurality of strands, the plurality of strands are preferably stranded. The insulating covering 28 is formed of a resin material such as polyvinyl chloride (PVC) or polyethylene (PE) extrusion-molded around the core wire 26. Herein, the electrical wire 24 is a so-called round wire having a round shape in cross section.

The plurality of electrical wires 24 are disposed on a main surface of the sheet material 30. A route of the electrical wire 24 on the sheet material 30 may be appropriately set. In the example illustrated in FIG. 1, the electrical wire 24 is linearly disposed on the sheet material 30, but may be bended and disposed, or may be disposed to have both a linear part and a bended part. In the example illustrated in FIG. 1, the plurality of electrical wires 24 are parallelly disposed on the sheet material 30, however, at least some of the plurality of electrical wires 24 may extend along a different route.

A connector, for example, is provided on an end portion of the electrical wire 24, and the connector is connected to a partner connector provided on a component to which the wiring member 20 is connected. For example, the connector is formed by housing the end portion of the electrical wire 24 in an electrical wire housing part of a housing. In the example illustrated in FIG. 1, the end portion of the electrical wire 24 extends outside the sheet material 30, however, the end portion of the electrical wire 24 may be located on the sheet material 30. In this case, the housing may be or may not be directly fixed to the sheet material 30. The end portion of the electrical wire 24 may be located on the plate-like member 10 or may extend outside the plate-like member 10.

The sheet material 30 keeps the plurality of electrical wires 24 in a flat state. Herein, the electrical wire 24 is disposed on the sheet material 30. The electrical wire 24 and the sheet material 30 are fixed to each other. Applicable as the above fixing state are a contact area fixation and a non-contact area fixation, or both fixations may be used together. Herein, the contact area fixation indicates that a portion where the electrical wire 24 and the sheet material 30 have contact with each other is stuck and fixed. The non-contact area fixation is a fixing state which is not the contact area fixation, and indicates that a sewing thread, the other sheet material, or an adhesive tape presses the electrical wire 24 toward the sheet material 30 or sandwiches the electrical wire 24 and the sheet material 30 to keep them in a fixing state. In the description hereinafter, the electrical wire 24 and the sheet material 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the electrical wire 24 and the sheet material 30 are indirectly stuck and fixed via an adhesive agent, a gluing agent, and a double-sided adhesive tape provided therebetween. The contact area direct fixation indicates that the electrical wire 24 and the sheet material 30 are directly stuck and fixed without an intervention of the adhesive agent, for example, which is separately provided. Considered in the contact area direct fixation is that resin included in at least one of the electrical wire 24 and the sheet material 30 is melted, thus the electrical wire 24 and the sheet material 30 are stuck and fixed, for example. In the description hereinafter, the electrical wire 24 and the sheet material 30 are in the state of the contact area direct fixation.

In forming the state of such a contact area direction fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 24 and the sheet material 30 are in the state of the contact area direct fixation by these means. Specifically, when the state of the contact area direct fixation is formed by the ultrasonic welding, for example, the electrical wire 24 and the sheet material 30 are in the state of the contact area direct fixation by the ultrasonic welding.

In the case of the contact area direct fixation, only one of the resin included in the covering of the electrical wire 24 and the resin included in the sheet material 20 may be melted, or both of them may be melted. In the former case, the resin which has been melted is stuck on an outer surface of the resin which has not been melted, and a relatively clear interface may be formed in some cases. In the latter case, there may be a case where both the resins are mixed and a clear interface is not be formed. Particularly, when the covering of the electrical wire 24 and the sheet material 30 include compatible resins such as the same resin materials, for example, there may be a case where both the resins are mixed and a clear interface is not be formed.

A material constituting the sheet material 30 is not particularly limited. The material constituting the sheet material 30 may include resin such as PVC, PE, polyethylene terephthalate (PE), or polypropylene (PP), for example, or may include metal such as aluminum or copper. However, when the electrical wire 24 and the sheet material 30 are formed in the state of contact area direct fixation, it is preferable that the insulating covering 28 of the electrical wire 24 and the sheet material 30 are formed of compatible resins such as the same resin materials.

The sheet material 30 may be made of a material having fiber such as a woven cloth, a knitted cloth, or a nonwoven cloth, for example, or may not have fiber but be bonded and formed by extrusion molding or injection molding. In the latter case, the sheet material 30 may be a foam formed by foam molding, or may be molded to have a filled cross section instead of the foam molding.

The sheet material 30 may have a single layer structure or a multilayer structure. When the sheet material 30 has the multilayer structure, it is considered that a resin layer and a resin layer are stacked, for example. It is also considered that a resin layer and a metal layer are stacked, for example. It is also considered that a metal layer and a metal layer are stacked, for example. When the sheet material 30 is made by stacking the resin layer and the resin layer, layers with fiber or layers with no fiber may be overlapped with each other, or a layer with fiber and a layer with no fiber may be overlapped with each other.

When the sheet material 30 has the multilayer structure, the sheet material 30 may be molded by bonding sheet-like members which have been separately molded, or may be molded by single extrusion molding or injection molding.

<Fixing Member>

The fixing member 40 is a member the fixing the wiring member 20 to the plate-like member 10. The fixing member 40 includes a housing part 44, a locking protrusion 50, and a protrusion extension part 62. The fixing member 40 further includes a housing part retaining piece 54. The fixing member 40 further includes a protrusion extension part retaining piece 64.

Herein, the fixing member 40 is divided into a first member 42 and a second member 60. The first member 42 includes the housing part 44, the locking protrusion 50, and a locked part 56. The first member 42 further includes the housing part retaining piece 54. The second member 60 includes the protrusion extension part 62 and a locking part 66. The second member 60 further includes the protrusion extension part retaining piece 64. The locking 66 is locked to the locked part 56, thus the first member 42 and the second member 60 are locked to each other.

The housing part 44 is inserted into the plate-like member 10. Herein, the housing part 44 is housed in the concave part 16. The housing part 44 includes an insertion inlet 45 into which the protrusion extension part 62 is inserted. Herein, the housing part 44 includes a plurality of division pieces 46 arranged in a circumferential direction to have a cylindrical shape in whole and a connection cylindrical part 47 connecting the plurality of division pieces 46 in the circumferential direction.

Herein, eight division pieces 46 are arranged in the circumferential direction. Each division piece 46 is connected by the connection cylindrical part 47 at one end portion side of the division piece 46. Each division piece 46 includes a thinly-formed part in one end portion. The thin part functions as a hinge part. That is to say, when the protrusion extension part 62 is inserted into the housing part 44, mainly the thin part is elastically deformed and the other end portion side is bent thereby. Each division piece 46 is formed into the same shape. Obviously, there may also be a case where some of the division pieces 46 are formed into a different shape.

The adjacent division pieces 46 are arranged at intervals in the circumferential direction. In the example illustrated in FIG. 3, an interval between the adjacent division pieces 46 is smaller than a dimension of the division piece 46 in the circumferential direction around a part connected to the connection cylindrical part 47. Obviously, the interval between the adjacent division pieces 46 may also be equal to or larger than the dimension of the division piece 46 in the circumferential direction around the part connected to the connection cylindrical part 47. That is to say, the interval between the adjacent division pieces 46 is not particularly limited, but can be appropriately set.

The connection cylindrical part 47 connects the plurality of division pieces 46 at one end portion side thereof. The part of the housing part 44 to which the plurality of division pieces 46 are connected by the connection cylindrical part 47 is the insertion inlet 45 into which the protrusion extension part 62 is inserted. A side of the insertion inlet 45 is referred to as a base end portion and a side opposite to the side of the insertion inlet 45 is referred to as a tip end portion in the housing part 44 and the division piece 46 in some cases hereinafter.

As illustrated in FIG. 4, an inner peripheral surface of the housing part 44 is defined as a tapered surface 48, and functions as a guide at a time of insertion. More specifically, the housing part 44 is formed so that a space thereof becomes narrow from the insertion inlet 45 toward inside in a state before the protrusion extension part 62 is housed therein. Herein, an inner peripheral surface of each division piece 46 is formed to gradually get closer to each other from the base end portion toward the tip end portion. More specifically, herein, the inner peripheral surface of each division piece 46 is formed to gradually get closer to a central part from the base end portion toward the tip end portion. When the protrusion extension part 62 is inserted, the inner peripheral surface of each division piece 46 is gradually pressed by the protrusion extension part 62, thus the tip end portion of each division piece 46 is bent at the thin part so that the tip end portion gradually spreads outside.

The locking protrusion 50 is provided to extend outward from the housing part 44. The locking protrusion 50 is provided on a tip end of the housing part 44. The locking protrusion 50 includes a division locking protrusion 52 provided on each of the plurality of division pieces 46. The division locking protrusion 52 is provided on a tip end of the division piece 46. In the description herein, the division locking protrusion 52 is provided on all of the division pieces 46, however, this configuration is not necessary. There may also be a case where the division locking protrusion 52 is not provided on some of the division pieces.

The locking protrusion 50 is formed to be housed in the concave part 16 in a state before the locking protrusion 50 is spread by the protrusion extension part 62. Herein, all of the division locking protrusions 52 are formed to be housed in the concave part 16 at the same time without deformation in a state before the division locking protrusions 52 are spread by the protrusion extension part 62.

The locking protrusion 50 sticks inside the plate-like member 10. The locking protrusion 50 sticks inside the plate-like member 10 where a hole is not formed in advance. Herein, each division locking protrusion 52 sticks inside the plate-like member 10 from the inner peripheral surface of the concave part 16. Particularly, each division locking protrusion 52 sticks in a part of the inner peripheral surface of the concave part 16 where a hole is not formed in advance.

The locking protrusion 50 is formed into a tapered shape so as to be able to stick inside the plate-like member 10. Accordingly, the locking protrusion 50 can stick inside the plate-like member 10 where a hole is not formed in advance. Particularly, the locking protrusion 50 can stick in a part of the inner peripheral surface of the concave part 16 where a hole is not formed. Herein, the division locking protrusion 52 is formed into a tapered shape so as to be able to stick inside the plate-like member 10. Accordingly, the division locking protrusion 52 can stick inside the plate-like member 10 where a hole is not formed in advance. Particularly, the division locking protrusion 52 can stick in a part of the inner peripheral surface of the concave part 16 where a hole is not formed. Specifically, as illustrated in FIG. 2 and FIG. 3, the division locking protrusion 52 is formed into a tapered shape only in a thickness dimension, in a thickness dimension and a dimension in the circumferential direction. Herein, the dimension of the division locking protrusion 52 in the circumferential direction gradually increases from the base end toward the tip end, but may not change. The division locking protrusion 52 may be formed into a tapered shape only in the dimension in the circumferential direction, in the thickness dimension and the dimension in the circumferential direction, or may also be formed into a tapered shape in both dimensions.

In the example illustrated in FIG. 4, the locking protrusion 50 is formed to extend in a direction perpendicular to an insertion direction of the protrusion extension part 62 in a state before being spread by the protrusion extension part 62. The locking protrusion 50 extends to a side of the insertion inlet 45 as illustrated in FIG. 2 in a state of being spread by the protrusion extension part 62. Accordingly, the fixing member 40 hardly comes out of the plate-like member 10. Herein, the division locking protrusion 52 forms a sharp angle with a direction in which the division piece 46 extends from the tip end portion of the division piece 46 and extends toward a side on which the base end portion of the division piece 46 is located, and the division piece 46 is bent by the protrusion extension part 62, thus the locking protrusion 50 operates as described above.

The housing part retaining piece 54 is formed to extends outside from the housing part 44 and is caught on one main surface 13 of the plate-like member 10. Herein, the housing part retaining piece 54 is formed to extends outside from the base end portion of the housing part 44. Particularly herein, a peripheral edge part of the connection cylindrical part 47 is elongated outside as it is to form the housing part retaining piece 54. Thus, the housing part retaining piece 54 is formed into a crocodile shape. The housing part retaining piece 54 is formed larger than the concave part 16 and is caught on the peripheral edge part of the concave part 16.

As illustrated in FIG. 4, the housing part retaining piece 54 is formed to extend in a direction perpendicular to an insertion direction of the protrusion extension part 62 in a state before being spread by the protrusion extension part 62. Accordingly, the locking protrusion 50 and the housing part retaining part 54 are in a parallel state in a state before being spread by the protrusion extension part 62. The housing part retaining piece 54 functions as a retaining part preventing the first member 42 from coming out of the plate-like member 10 toward a front side in an insertion direction thereof. In contrast, the locking protrusion 50 mainly functions as a detent preventing the first member 42 from returning backward in the insertion direction with respect to the plate-like member 10.

The protrusion extension part 62 is housed in the housing part 44. The protrusion extension part 62 spreads the locking protrusion 50 outside to lock the locking protrusion 50 inside the plate-like member 10. Herein, the protrusion extension part 62 spreads the housing part 44, thereby spreading the locking protrusion 50. More specifically, the protrusion extension part 62 spreads each division piece 46, thereby spreading the division locking protrusion 52.

The protrusion extension part 62 is formed into a columnar shape or a cylindrical shape, for example. In the example illustrated in FIG. 2, the protrusion extension part 62 is formed into circular cylindrical shape. Accordingly, a through hole 62h is formed in the protrusion extension part 62, however, this configuration is not necessary. A peripheral edge part of the tip end portion of the protrusion extension part 62 is defined as a tapered surface 63, and functions as a guide at the time of insertion. More specifically, when force is further applied after the tip end portion of the protrusion extension part 62 has direct contact with the inner peripheral surface of the housing part 44, the protrusion extension part 62 spreads the housing part 44 and is guided inside.

The protrusion extension part retaining piece 64 is formed to extend outside from the protrusion extension part 62, and is caught on an edge portion of the housing part 44. Herein, the protrusion extension part retaining piece 64 is formed to extend outside from the base end portion of the protrusion extension part 62. The protrusion extension part retaining piece 64 is formed into a crocodile shape. The protrusion extension part retaining piece 64 is formed to extend in a direction perpendicular to the extension direction of the protrusion extension part 62. The protrusion extension part retaining piece 64 is formed larger than the insertion inlet 45, and is caught on the connection cylindrical part 47 which is the peripheral edge part of the insertion inlet 45. Particularly herein, the protrusion extension part retaining piece 64 is formed larger than the concave part 16 and is caught on the housing part retaining piece 54.

The first member 42 and the second member 60 are locked to each other by reason that the locked part 56 and the locking part 66 are locked to each other. The locked part 56 is provided on the inner peripheral surface of the housing part 44. The locking part 66 is provided on the outer peripheral surface of the protrusion extension part 62. The locking convex parts are formed as the locked part 56 and the locking part 66. Each of the locked part 56 and the locking part 66 functions as a detent preventing the second member 60 from returning backward in the insertion direction with respect to the first member 42. The protrusion extension part retaining piece 64 functions as a retaining part preventing the second member 60 from coming out of the first member 42 toward the front side in the insertion direction.

It is preferable that the part ranging from the housing part retaining piece 54 to the locked part 56 in the first member 42 is sandwiched and held by the part ranging from the protrusion extension part retaining piece 64 to the locking part 66 in the second member 60 in the state where the locked part 56 and the locking part 66 are locked to each other. Accordingly, the first member 42 and the second member 60 hardly flutters in the locking state. When the first member 42 and the second member 60 flutter in the locking state, the other member such as the sheet material 30 is inserted between the housing part retaining piece 54 and the protrusion extension part retaining piece 64, thus the flutter can be suppressed.

As illustrated in FIG. 2, the tip end portion of the fixing member 40 is housed inside the plate-like member 10 in the state where the fixing member 40 is locked to the plate-like member 10. That is to say, the tip end portion of the fixing member 40 does not protrude outside the other main surface 14.

Furthermore, herein, as illustrated in FIG. 4, the tip end portion of the first member 42 is housed inside the plate-like member 10 in the state before the fixing member 40 is locked to the plate-like member 10. That is to say, the tip end portion of the first member 42 does not protrude outside the other main surface 14. In the first member 42, the height dimension from the housing part retaining piece 54 is smaller than the thickness dimension of the plate-like member 10 in the part where the concave part 16 is formed.

The first member 42 and the second member 60 are considered an integrated molded component of metal or resin as a material formed by injection molding using molds, for example. When the first member 42 is molded using resin as a material and when the locking protrusion 50 sticks in the part of the plate-like member 10 where the hole is not formed in advance, it is sufficient that the locking protrusion 50 is formed harder than the plate-like member 10.

<Fixation of Wiring Member to Plate-like Member>

Herein, a part of a flat sheet-like wire body (the sheet material 30 herein) is sandwiched and held by the plate-like member 10 and the fixing member 40 locked to the plate-like member 10 to fix the wiring member 20 to the plate-like member 10. More specifically, the sheet material 30 has a fixing piece 34 extending to a lateral side of a wire disposed part 32 where the electrical wire 24 is disposed. A through hole 35 is formed in the fixing piece 34. The fixing piece 34 is sandwiched and held between the housing part retaining piece 54 and the plate-like member 10 in a state where the housing part 44 inserted into the through hole 35.

In the example illustrated in FIG. 1, the fixing piece 34 is provided on four sides of the sheet material 30 formed into a rectangular shape, however, this configuration is not necessary. A location where the fixing piece 34 is provided may be appropriately set. It is also applicable that the sheet material constituting the fixing piece 34 is separately provided on the sheet material 30 constituting the wire disposed part 32, and the sheet material and the sheet material 30 are fixed to each other. It is also applicable that the fixing piece 34 is not provided but the housing part 44 is inserted between the electrical wires 24 in the wire disposed part 32. The through hole 35 through which the housing part 44 passes may not be formed in advance.

The sheet material 30, in the sheet material 30 and the electrical wire 24, is disposed on the side of the plate-like member 10 in the sheet material-attached wire body 22 in which the sheet material 30 covers only one side of the electrical wire 24, however, this configuration is not necessary. The electrical wire 24, in the sheet material 30 and the electrical wire 24, may be disposed on the side of the plate-like member 10.

<Manufacturing Process>

In applying the fixing structure 1 of the wiring member to the vehicle, it is considered that a step (a) of attaching the fixing member 40 to the wiring member 20, a step (b) of fixing the fixing member 40 to the plate-like member 10, a step (c) of routing the wiring member 20 on the plate-like member 10, and a step (d) of assembling the plate-like member 10 to a vehicle are performed. The step (a) to the step (c) are steps of manufacturing the fixing structure 1 of the wiring member.

A procedure of the step (a) to the step (d) is not particularly limited, however, it is sufficient that the step (a) to the step (d) are performed in an optional order. However, it is preferable that the step (d) is performed after the step (a) to the step (c) are performed. That is to say, it is preferable that in a state where the wiring member 20 is fixed to the plate-like member 10 by the fixing member 40 and the integrated component of them constitutes the fixing structure 1 of the wiring member (which can also be considered a plate-like member module), the plate-like member module is assembled to a vehicle. Accordingly, a process of assembling the plate-like member 10 and the wiring member 20 to the vehicle can be simplified.

<Effect Etc.>

According to the fixing structure 1 of the wiring member having such a configuration, the locking protrusion 50 of the fixing member 40 is locked inside the plate-like member 10, thus the fixing member 40 is fixed to the plate-like member 10. When the fixing member 40 is used, the wiring member 20 can be easily fixed to the plate-like member 10 formed separately from the wiring member 20.

The fixing member 40 is divided into the first member 42 and the second member 60. At this time, the second member 60 is inserted into the first member 42, thus the first member 42 can be locked to the plate-like member 10.

The locked part 56 is provided on the inner peripheral surface of the housing part 44, and the locking part 66 is provided on the outer peripheral surface of the protrusion extension part 62, thus the extension of the locking protrusion 50 and the locking of the first member 42 and the second member 60 can be performed at the same time by inserting the second member 60 into the first member 42.

The locking protrusion 50 is formed have a size so as to be housed in the concave part 16 in the state before the locking protrusion 50 is spread by the protrusion extension part 62, thus the housing part 44 can be inserted into the concave part 16 from the side of the locking protrusion 50.

The locking protrusion 50 is formed into the tapered shape so as to be able to stick inside the plate-like member 10, thus the fixing member 40 can be easily locked even when the plate-like member 10 is a soft member.

The housing part 44 and the locking protrusion 50 are divided in the circumferential direction, thus the locking protrusion 50 can be easily extended when the protrusion extension part 62 is housed in the housing part 44.

The housing part retaining piece 54 is provided, thus it is possible to prevent the housing part 44 from coming out of the plate-like member 10 toward the front side.

The protrusion extension part retaining piece 64 is provided, thus it is possible to prevent the protrusion extension part 62 from coming out of the housing part 44 toward the front side.

The tip end portion of the fixing member 40 does not protrude outside the other main surface 14, thus it is possible to prevent the fixing member 40 from having contact with a member such as a vehicle body panel located outside the other main surface 14, for example. The operation of attaching the fixing member 40 to the plate-like member 10 can be performed while locating the plate-like member 10 on the flat surface. Particularly, the operation of attaching the fixing member 40 to the plate-like member 10 can be performed even when the side of the other main surface 14 of the concave part 16 is covered by the flat surface in the state where the plate-like member 10 is disposed on the flat surface.

First Modification Example

Figure 5:
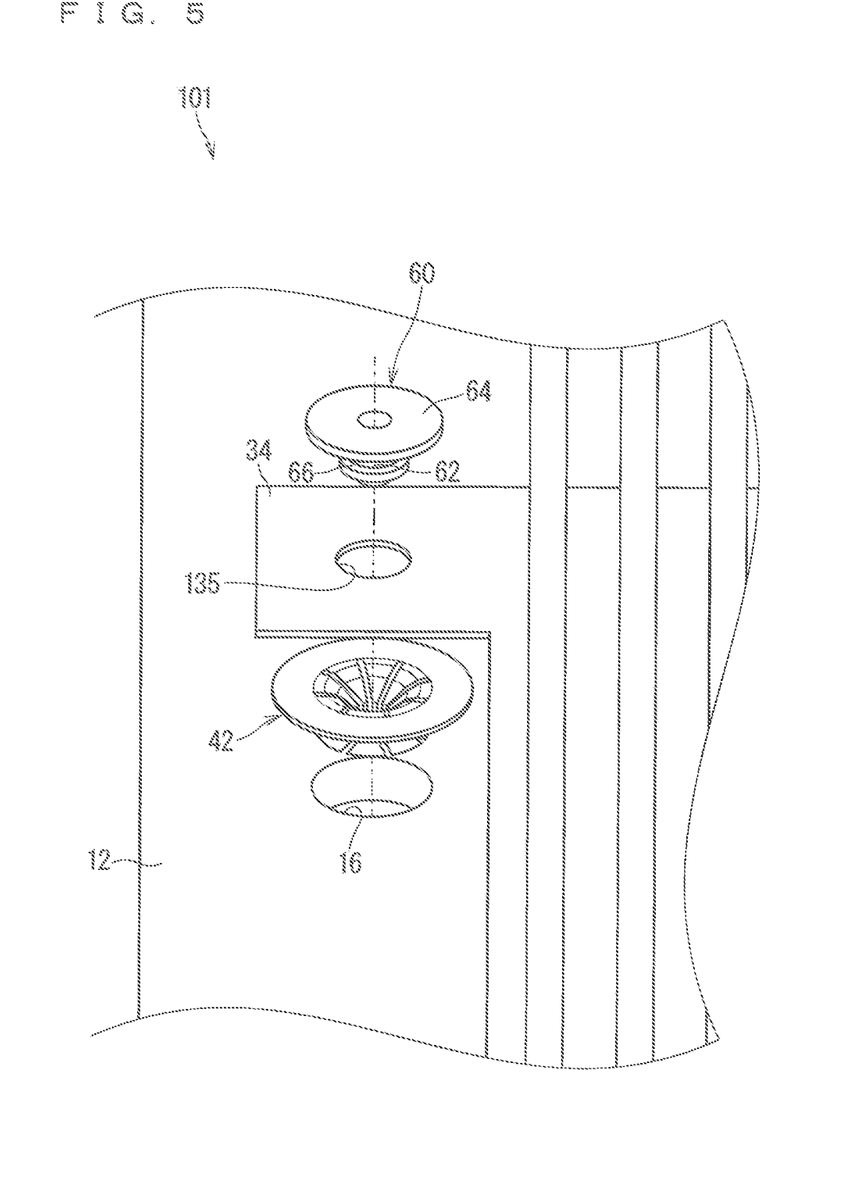
FIG. 5 is an exploded perspective view illustrating a first modification example of a fixing structure of a wiring member.

FIG. 5 is an exploded perspective view illustrating a first modification example of the fixing structure 1 of the wiring member.

In a fixing structure 101 of a wiring member according to a first modification example, a configuration of attaching the fixing member 40 to the sheet material-attached wire body 22 is different from the configuration of attaching the fixing member 40 to the sheet material-attached wire body 22 in the fixing structure 1 of the wiring member described above.

Specifically, in the above description, the sheet material 30 is sandwiched and held between the first member 42 and the plate-like member 10 in attaching the sheet material-attached wire body 22, however, this configuration is not necessary. For example, the sheet material 30 may be sandwiched and held between the first member 42 and the second member 60. For example, the main surface of the protrusion extension part retaining piece 64 of the second member 60 may be attached to the main surface of the sheet material 30 (the main surface where the electrical wire 24 is disposed or the main surface on a rear side thereof), for example. For example, it is also applicable that one more retaining piece is provided in addition to the housing part retaining piece 54 or the protrusion extension part retaining piece 64 on the first member 42 or the second member 60, and the sheet material 30 is sandwiched and held between one group of retaining pieces in the first member 42 or the second member 60.

In the example illustrated in FIG. 5, the sheet material 30 is sandwiched and held between the first member 42 and the second member 60. In this case, it is sufficient that a through hole 135 formed in the sheet material 30 is formed smaller than the locking part 66.

When the main surface of the protrusion extension part retaining piece 64 of the second member 60 is attached to the main surface of the sheet material 30, the main surface of the sheet material 302 and the main surface of the protrusion extension part retaining piece 64 may be indirectly attached to each other via an adhesive agent, for example, or may be directly attached to each other by welding, for example.

Second Modification Example

Figure 6:
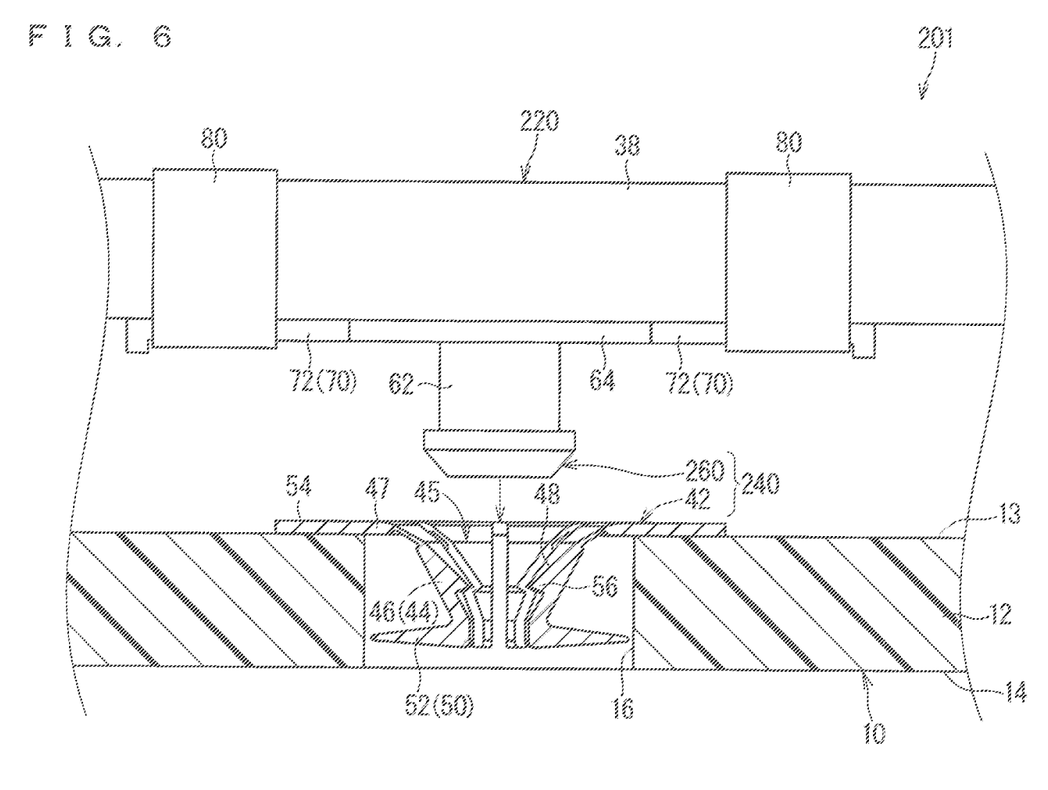
FIG. 6 is a side view illustrating a second modification example of a fixing structure of a wiring member.

FIG. 6 is a side view illustrating a second modification example of the fixing structure 1 of the wiring member.

In a fixing structure 201 of a wiring member according to a second modification example, a shape of a wiring member 220 and a configuration of attaching a fixing member 240 to the wiring member 220 is different from the shape of the wiring member 20 and the configuration of attaching the fixing member 40 to the wiring member 20 in the fixing structure 1 of the wiring member described above.

Specifically, with regard to the shape of the wiring member 220, a plurality of wire-like transmission members 24 are bundled by a banding member 38 to constitute the wiring member 220. Herein, the plurality of wire-like transmission members 24 are bundled into a round shape in cross-section to constitute the wiring member 220.

A type of the banding member 38 and a method of bundling the plurality of wire-like transmission members 24 by the banding member 38 are not particularly limited. For example, it is considered that an adhesive tape is helically wound around the plurality of wire-like transmission members 24 in a form of rough winding or double winding to bundle the plurality of wire-like transmission members 24. For example, it is considered that a protection sheet material is wound in a form of sushi roll or rafter to bundle the plurality of wire-like transmission members 24. For example, it is considered that the plurality of wire-like transmission members 24 are housed in a tubular member such as a corrugated tube and bundled. For example, it is considered that an adhesive tape or a banding band is wound around the plurality of wire-like transmission members 24 in a plurality of positions at intervals along a longitudinal direction of the wire-like transmission member 24 to bundle the plurality of wire-like transmission members 24.

With regard to the configuration of attaching the fixing member 240 to the wiring member 220, the fixing member 240 includes an extension piece 72 as a fixing part 70 for fixing the wiring member 220. The extension piece 72 and the wiring member 220 are bundled by a banding member 80. Thus, the fixing member 240 is attached to the wiring member 220.

In the example illustrated in FIG. 6, the extension piece 72 is provided on a second member 260. Specifically, the extension piece 72 is provided to extend from the peripheral edge part of the protrusion extension part retaining piece 64 along one direction. The wiring member 220 is disposed on the protrusion extension part 62. However, the extension piece 72 may be provided in a position being offset with respect to the protrusion extension part 62. More specifically, the extension piece may be provided to extend in a second direction crossing a first direction from an extension part in which the peripheral edge part of the protrusion extension part retaining piece 64 extends along the first direction.

In the example illustrated in FIG. 6, one pair of extension pieces 72 are provided in directions opposite to each other, however, only one extension piece 72 may be provided.

The banding member 80 is not particularly limited. The banding member 80 may be provided separately from the fixing member 240, or may also be integrally formed with the fixing member 240. When the banding member 80 is a member provided separately from the fixing member 240, an adhesive tape or a banding band, for example, is considered to be adopted as the banding member 80. When the banding member 80 is integrally formed with the fixing member 240, it is considered that a banding band structure including a band part and a band fixing part as the banding member 80 is provided as the fixing part 70 of the fixing member 240, for example.

The banding member 80 may be wound to be overlapped with a position where a banding member 38 bundling the plurality of wire-like transmission members 24 is located, or may also be wound around a position where the banding member 38 bundling the plurality of wire-like transmission members 24 is not located.

In the example illustrated in FIG. 6, the fixing part 70 is provided on the second member 260, however, this configuration is not necessary. The fixing part 70 may be provided on the first member 42. In this case, it is sufficient that the fixing part 70 is provided on a position being offset with respect to the housing part 44.

Other Modification Example

In the above description, the flat wire body is the sheet material-attached wire body 22, however, this configuration is not necessary. The flat wire body may be a so-called flexible flat cable (FFC) in which a plurality of core wires 26 are collectively covered by one covering or a so-called flexible print circuit (FPC) in which a circuit is formed in conductive foil attached to an insulating film as a base. The flat wire body may be made up of the plurality of wire-like transmission members 24, each having the covering, further collectively covered by the other one covering. At this time, the flat wire body may have a structure in which the plurality of transmission wire bodies or the plurality of wire-like transmission members are collectively sandwiched by a covering member.

Also when the flat wire body is the sheet material-attached wire body 22, the configuration thereof is not limited to that described above. With regard to the shape of the wire-like transmission member 24, for example, an outer shape of the wire-like transmission member 24 may be formed into a quadrangular shape in cross section. In this case, an area of contact between the sheet material 30 and the wire-like transmission member 24 can be easily increased. The sheet material-attached wire body 22 may include a cover covering the wire-like transmission member 24 from a side opposite to the sheet material 30 described above. That is to say, the plurality of wire-like transmission members 24 may be collectively sandwiched by the sheet material 30 and the cover. The cover may be integrated with or separated from the sheet material 30. When the cover is separated from the sheet material 30, the cover may be the same type as the sheet material 30, or a material, a structure, and a function of the cover may be different from those of the sheet material 30.

In the above description, the hole in which the locking protrusion 50 sticks is not formed in the plate-like member 10 in advance, however, this configuration is not necessary. The hole in which the locking protrusion 50 sticks may be formed in the plate-like member 10 in advance. In this case, there may also be a case where the tip end of the locking protrusion 50 is not formed into the tapered shape.

In the above description, the housing part 44 is divided, however, this configuration is not necessary. The housing part 44 may not be divided. The housing part 44 may not be divided into eight parts even when the housing part 44 is divided. The housing part 44 may be divided into two to seven parts, or may also be divided into nine or more parts.

The configuration of the fixing member 40 may be partially omitted. For example, the housing part retaining piece 54 may be omitted. In this case, it is sufficient that the locking protrusion 50 is locked to the plate-like member 10 to prevent the first member 42 from coming out of the plate-like member 10 and returning backward with respect to the plate-like member 10. For example, the protrusion extension part retaining piece 64 may be omitted. In this case, it is sufficient that the locked part 56 and the locking part 66 are locked to each other to prevent the second member 60 from coming out of the first member 42 and returning backward with respect to the first member 42.

The positions and shapes of the locked part 56 and the locking part 66, for example, are not limited thereto described above. With respect to the positions of the locking part 66 and the locked part 56, for example, it is applicable that the locked part 56 is provided on the housing part retaining piece 54 and the locking part 66 is provided on the protrusion extension part retaining piece 64. For example, it is applicable that the locked part 56 is provided on the tip end of the housing part 44 and the locking part 66 is provided on the tip end of the protrusion extension part 62. One of the locked part 56 and the locking part 66 may have a shape of a locking concave part, for example. Specifically, it is applicable that the through hole 35 is formed as the locked part 56 on the inner peripheral surface of the housing part 44, and the locking part 66 is formed to be locked to the through hole 35, for example.

In the above description, the fixing member 40 is divided into the first member 42 having the housing part 44 and the locking protrusion 50 and the second member 60 having the protrusion extension part 62, however, this configuration is not necessary. The housing part 44, the locking protrusion 50, and the protrusion extension part 62 may be integrally molded to be the fixing member. Considered as such as integrated fixing member is that the rod-like protrusion extension part 62 passing inside the cylindrical housing part 44 is connected to one end of the housing part 44 and the protrusion extension part 62 is pulled, thus a middle portion of the housing part 44 is buckled and spread outside to constitute the locking protrusion 50, for example.

Even in the case where the fixing member 40 is divided into the first member 42 and the second member 60, the configuration is not limited thereto described above. It is considered, for example, that the first member 42 and the second member 60 are linked so as not to be separated from each other. It is considered, for example, that the second member 60 is formed to be inserted into the first member 42 from the side of the locking protrusion 50.

When the first member 42 and the second member 60 are linked so as not to be separated from each other, it is considered that the first member 42 and the second member 60 are linked by a hinge or an elongated band-like piece having flexibility, for example. It is considered that the hinge or the band-like piece is provided to connect an edge portion of the housing part retaining piece 54 of the first member 42 and the edge portion of the protrusion extension part retaining piece 64 of the second member 60, for example.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 fixing structure of wiring member
10 plate-like member
12 body part
13 one main surface
14 other main surface
16 concave part
20 wiring member
22 sheet material-attached wire body
24 wire-like transmission member
26 core wire
28 insulating covering
30 sheet material
32 wire disposed part
34 fixing piece
35 through hole
40 fixing member
42 first member
44 housing part
45 insertion inlet
46 division piece
47 connection cylindrical part
50 locking protrusion 52 division locking protrusion
54 housing part retaining piece
56 locked part
60 second member
62 protrusion extension part
64 protrusion extension part retaining piece
66 locking part

The invention claimed is:

1. A fixing structure of a wiring member, comprising:
a plate member provided in a vehicle, the plate member including a concave part provided in a main surface of the plate member;
a wiring member disposed on the main surface of the plate member; and
a fixing member including:
a first member including a housing part inserted into the concave part of the plate member, and a locking protrusion provided to extend outward from the housing part, and
a second member including a protrusion extension part inserted and housed in the housing part, the protrusion extension part spreading the locking protrusion outside and sticking the locking protrusion into an inner peripheral surface of the concave part of the plate member to fix the wiring member to the plate member, wherein
the wiring member includes a sheet material in which a through hole is provided,
the housing part is inserted into the through hole,
a distal end of the housing part is inside the concave part, and
a distal end of the protrusion extension part is inside the housing part and inside the concave part in an insertion direction, in which the protrusion extension part is inserted into the housing part.

2. The fixing structure of the wiring member according to claim 1, wherein
the locking protrusion is provided to extend outward from the distal end of the housing part,
the first member further includes a locked part that extends inward from the housing part at a position farther from the distal end of the housing part than the locking protrusion; and
the second member further includes a locking part locked to the locked part.

3. The fixing structure of the wiring member according to claim 2, wherein
the locked part is provided on an inner peripheral surface of the housing part, and
the locking part is provided on an outer peripheral surface of the protrusion extension part.

4. The fixing structure of the wiring member according to claim 1, wherein
the housing part is housed in the concave part provided in the main surface of the plate member in advance, and
the locking protrusion is configured to be housed in the concave part in a state before the locking protrusion is spread by the protrusion extension part.

5. The fixing structure of the wiring member according to claim 1, wherein
the plate member is softer than the locking protrusion, and
the locking protrusion has a tapered shape so as to be able to stick into the plate member.

6. The fixing structure of the wiring member according to claim 1, wherein
the housing part includes a plurality of division pieces arranged in a circumferential direction to have a cylindrical shape in whole and a connection cylindrical part connecting the plurality of division pieces in a circumferential direction on a side opposite to the locking protrusion, and
the locking protrusion includes a division locking protrusion provided on a tip end of each of the plurality of division pieces.

7. The fixing structure of the wiring member according to claim 1, wherein
the first member of the fixing member further includes a housing part retaining piece configured to extend outward from the housing part and caught on the main surface of the plate member.

8. The fixing structure of the wiring member according to claim 1, wherein
the second member of the fixing member further includes a protrusion extension part retaining piece configured to extend outward from the protrusion extension part and caught on an edge portion of the housing part.

9. The fixing structure of the wiring member according to claim 1, wherein
a tip end portion of the fixing member is housed inside the plate member.

10. The fixing structure of the wiring member according to claim 1, wherein
the wiring member includes a plurality of wire-like transmission members flattened by the sheet material, and
the through hole is formed in a part of the sheet material different from a part where the plurality of wire-like transmission members are disposed.

11. A fixing structure of a wiring member, comprising:
a plate member provided in a vehicle, the plate member including a concave part provided in a main surface of the plate member;
a wiring member disposed on the main surface of the plate member; and
a fixing member including:
a first member including a housing part inserted into the concave part of the plate member, and a locking protrusion provided to extend outward from the housing part, and
a second member including a protrusion extension part inserted and housed in the housing part, the protrusion extension part spreading the locking protrusion outside and sticking the locking protrusion into an inner peripheral surface of the concave part of the plate member to fix the wiring member to the plate member, wherein
the fixing member includes a fixing part fixed to the wiring member in a state before the protrusion extension part is housed in the housing part,
a distal end of the housing part is inside the concave part, and
a distal end of the protrusion extension part is inside the housing part and inside the concave part in an insertion direction, in which the protrusion extension part is inserted into the housing part.

12. The fixing structure of the wiring member according to claim 11, wherein
the wiring member includes a sheet material, and
the fixing part is attached to a main surface of the sheet material.

13. The fixing structure of the wiring member according to claim 11, wherein
the wiring member includes a sheet material, and
the fixing part sandwiches the sheet material.

14. The fixing structure of the wiring member according to claim 2, wherein
the locked part of the first member includes a first step such that the housing part above the first step extends inward than the housing part below the first step, and
the locking part of the second member includes a second step such that the protrusion extension part below the second step extends outward than the protrusion extension part above the second step.

\* \* \* \* \*